(12) United States Patent
Kiyokawa

(10) Patent No.: US 12,139,334 B2
(45) Date of Patent: Nov. 12, 2024

(54) ARTICLE TRANSPORT APPARATUS

(71) Applicant: Daifuku Co., Ltd., Osaka (JP)

(72) Inventor: Wataru Kiyokawa, Tokyo (JP)

(73) Assignee: Daifuku Co., Ltd., Osaka (JP)

(*) Notice: Subject to any disclaimer, the term of this patent is extended or adjusted under 35 U.S.C. 154(b) by 303 days.

(21) Appl. No.: 17/727,880

(22) Filed: Apr. 25, 2022

(65) Prior Publication Data

US 2022/0340360 A1 Oct. 27, 2022

(30) Foreign Application Priority Data

Apr. 26, 2021 (JP) .................. 2021-074239

(51) Int. Cl.
*B65G 1/04* (2006.01)
*B66F 9/07* (2006.01)

(52) U.S. Cl.
CPC .............. *B65G 1/0421* (2013.01); *B66F 9/07* (2013.01); *B65G 2203/0208* (2013.01); *B65G 2203/042* (2013.01)

(58) Field of Classification Search
CPC ............... B65G 1/0421; B65G 1/0407; B65G 2203/0208; B66F 9/07; B66F 9/141; A01G 31/06
See application file for complete search history.

(56) References Cited

U.S. PATENT DOCUMENTS

| 2021/0237976 A1* | 8/2021 | Tsukamoto | B65G 1/1375 |
| 2022/0135328 A1* | 5/2022 | Shimamura | B65G 1/0421 |
| | | | 700/218 |
| 2022/0227578 A1* | 7/2022 | Kiyokawa | B65G 1/0421 |

FOREIGN PATENT DOCUMENTS

| JP | 2773580 | B2 | | 4/1998 | |
| JP | 2013136451 | A | * | 7/2013 | |
| JP | 201476015 | A | | 5/2014 | |
| JP | 2014076015 | A | * | 5/2014 | |
| JP | 2022168638 | A | * | 11/2022 | ........... B65G 1/0421 |

* cited by examiner

*Primary Examiner* — Kaitlin S Joerger
(74) *Attorney, Agent, or Firm* — The Webb Law Firm

(57) ABSTRACT

An article transport apparatus includes a travel carriage, a mast, a lift, and a transfer machine. The transfer machine includes a holder and a movement mechanism. The movement mechanism is configured to transfer an article between the holder and a storage rack. The article transport apparatus further includes a receiver supported by the lift and configured to receive liquid that has dripped from the article, a collector configured to collect the liquid received by the receiver, and a liquid detector configured to detect the amount of liquid collected in the collector. The receiver is disposed to cover, from below, the entire bottom surface of the article located at a holding position. The collector is connected to the receiver. The receiver includes a receiving surface that faces upward and that is entirely inclined to extend gradually downward toward the collector.

4 Claims, 5 Drawing Sheets

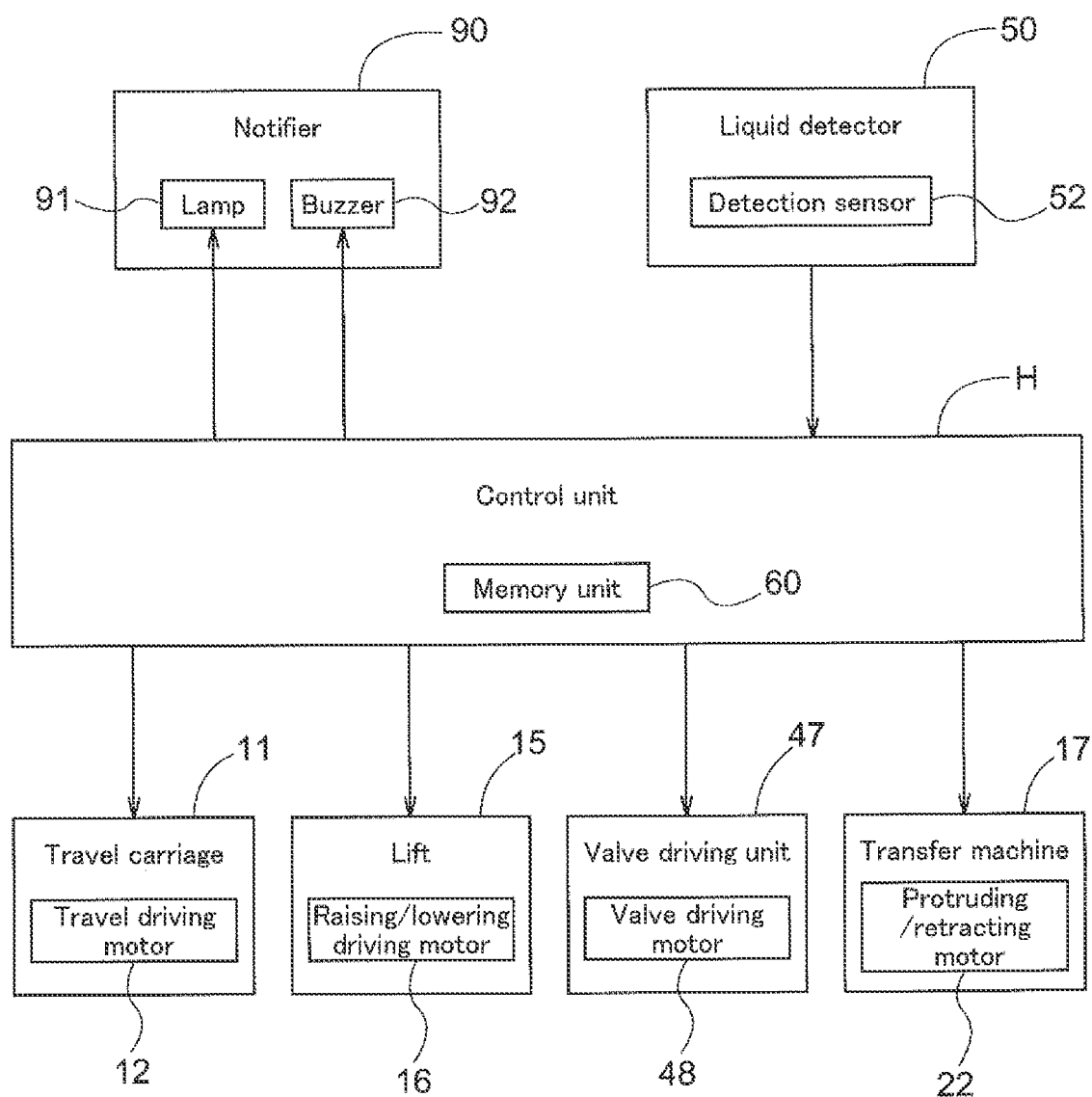

ARTICLE TRANSPORT APPARATUS

CROSS-REFERENCE TO RELATED APPLICATION

This application claims priority to Japanese Patent Application No. 2021-074239 filed Apr. 26, 2021, the disclosure of which is hereby incorporated by reference in its entirety.

BACKGROUND OF THE INVENTION

1. Field of the Invention

The present invention relates to an article transport apparatus that includes a travel carriage configured to travel on a travel path extending along the front face of a storage rack in which a plurality of articles are storable, a mast fixed to the travel carriage and extending in a vertical direction, a lift configured to move up and down along the mast, and a transfer machine mounted on the lift.

2. Description of the Related Art

Japanese Patent No. 2773580 (Patent Document 1) discloses a conventional article transport apparatus of this type. In the following description of the related art, reference numerals or names shown in parentheses are those used in Patent Document 1.

The article transport apparatus disclosed in Patent Document 1 includes a travel carriage (traveling chassis 15) configured to travel on a travel path (fixed path 3), a pair of masts (posts 11 and 12) fixed to the travel carriage (15) and extending in the vertical direction, a lift (17) configured to move up and down along the pair of masts (11, 12), and a fork-type transfer machine (loading/unloading apparatus 16) provided on the lift (17). A receiver (oil pan 29) is fixed to the lower portion of the lift (17), and is configured to move in the vertical direction together with the lift (17).

This article transport apparatus is used to transport an article (machine part 7) to which a large amount of oil is adhered due to processing treatment. Accordingly, oil may drip from the article (7) and splatter on the surface of a floor and the like during transport. To address this, a configuration is employed in which a pair of oil storage sections (29b) formed in the receiver (29) receive oil that drips from the article (7), and thus the oil is prevented from splattering on the surface of the floor and a floor rail (15). Each of the oil storage sections (29b) includes a bottom plate portion (30) provided with a through hole (36) that is in communication with a discharge hole (drain discharge hole 34). The oil stored in the oil storage sections (29b) is discharged to the outside through the through holes (36) and the discharge holes (34) while the lift (17) is at the lowest position.

SUMMARY OF THE INVENTION

The bottom plate portions (30) in the receiver (29) described in Patent Document 1 are formed in a flat shape. Accordingly, oil received by the receiver (29) is likely to remain on the bottom plate portions (30) at a higher rate, and thus it is difficult to appropriately channel the oil received by the receiver (29) to the through holes (36). In addition, when leaking of a liquid from an article during transport is a problem, for example, there are cases where it is necessary to detect the amount of liquid that has fallen from the article during transport. Since the bottom plate portions (30) in the receiver (29) described in Patent Document 1 are formed in an overall flat shape, it is difficult to accurately detect the amount of liquid received by the receiver (29) in such cases.

Therefore, it is desired to realize an article transport apparatus in which liquid that has dripped from an article can be appropriately received, and the amount of received liquid can be easily and accurately detected.

An article transport apparatus according to the present disclosure includes: a travel carriage configured to travel on a travel path extending along a front face of a storage rack in which a plurality of articles are storable; a mast fixed to the travel carriage and extending in a vertical direction; a lift configured to move up and down along the mast; a transfer machine mounted on the lift, the transfer machine including: a holder configured to hold an article; and a movement mechanism configured to move the article, the movement mechanism being configured to (i) move the article between a holding position, at which the article is held while the travel carriage is traveling and the lift is moving up or down, and a delivery position, at which the article is present when delivered to the storage rack, and to (ii) transfer the article between the holder and the storage rack; a receiver supported by the lift and configured to receive liquid that has dripped from the article; a collector configured to collect the liquid received by the receiver; and a liquid detector configured to detect an amount of the liquid collected by the collector, wherein the receiver covers, from below, an entire bottom surface of the article at the holding position, the collector is connected to the receiver, and the receiver has a receiving surface that faces upward and that is entirely inclined to extend gradually downward toward the collector.

With this configuration, the lift supports the receiver, and the receiver can be raised and lowered together with the lift, thus making it possible to keep the distance in the vertical direction between the receiver and the article constant. Also, the receiver is disposed to cover the entire bottom surface of an article located at the holding position from below, and therefore, even if liquid drips from any position of the article during transport, the receiver can more appropriately receive the liquid. Accordingly, it is possible to prevent the liquid that has dripped from the article during transport from splattering and falling on the travel carriage, the surface of the floor, and the like.

Also, the collector is connected to the receiver, and the entire receiving surface is inclined to extend gradually downward toward the collector. Accordingly, liquid received by the receiver can be appropriately collected in the collector. With this configuration, the liquid detector detects the liquid collected in the collector in this manner, and therefore, the amount of the liquid that has dripped from the article can be more easily and accurately detected compared with the case of detecting the amount of liquid in the receiver.

As described above, with this configuration, it is possible to realize an article transport apparatus in which liquid that has dripped from an article can be appropriately received, and the amount of received liquid can be easily and accurately detected.

BRIEF DESCRIPTION OF THE DRAWINGS

FIG. 7 is a control block diagram.

DETAILED DESCRIPTION OF PREFERRED EMBODIMENTS

1. Overall Outline

Figure 1:
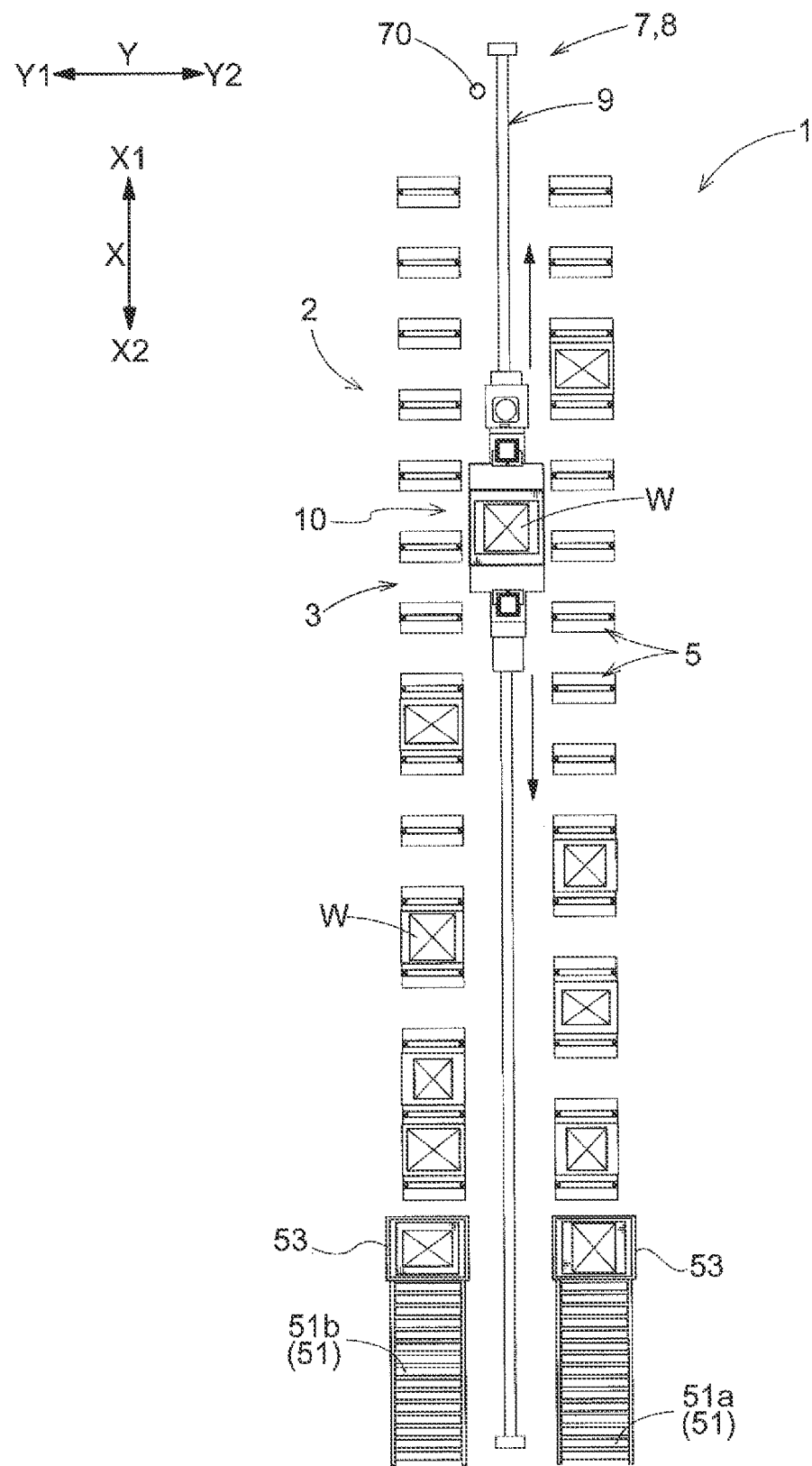
FIG. 1 is an overall plan view of an article storage facility.

An embodiment of an article transport apparatus will be described with reference to the drawings. The article transport apparatus of this embodiment is used in an article storage facility 1. The article storage facility 1 includes a storage rack 2 in which an article W is storable, a loading/unloading conveyor 51 configured to load and unload the article W between the article storage facility 1 and the outside, and an article transport apparatus 10 configured to transport the article W, as shown in FIG. 1. The article storage facility 1 of this example includes a pair of storage shelves 2 that are disposed such that the front faces thereof oppose each other. The article transport apparatus 10 moves in a passage 7 provided between the pair of storage shelves 2 along the front faces of the storage shelves 2, and transports the article W between the storage rack 2 and the loading/unloading conveyor 51. Note that, in this embodiment, the article W is transported and stored in the storage rack 2 while placed on a pallet P. In the following description, a direction extending along a travel path 8 for a travel carriage 11 included in the article transport apparatus 10 is defined as the "path direction X", and a direction orthogonal to the path direction X as viewed in a vertical direction Z is defined as the "width direction Y". Moreover, one side in the path direction X is defined as the "path direction first side X1", and the other side is defined as the "path direction second side X2". Similarly, one side in the width direction is defined as the "width direction first side Y1", and the other side is defined as the "width direction second side Y2". Note that the width direction Y corresponds to a rack front-back direction in the storage rack 2.

2. Storage Rack

The pair of storage shelves 2 are respectively provided on both sides in the width direction Y of the passage 7. Also, the pair of storage shelves 2 are disposed such that the front faces thereof are opposed to each other in the width direction Y. Specifically, the storage shelves 2 are disposed in such orientations that the front faces thereof (i.e., the faces thereof located on a side on which the articles W are loaded and unloaded) are opposed to the passage 7, as shown in FIG. 1. Accordingly, the pair of storage shelves 2 are disposed such that the front faces thereof oppose each other in the width direction Y. Each of the pair of storage shelves 2 includes a plurality of storage sections 3 in which the articles W are storable. In this embodiment, the plurality of storage sections 3 included in each of the pair of storage shelves 2 are lined up in the vertical direction Z and the path direction X. The plurality of storage sections 3 each include a pair of placement members 5 on which the pallet P is placeable and supportable. The article W is stored in the storage section 3 while placed on the pallet P. The article W of this example is a tank in which liquid 100 is stored. Note that the article W may be food such as a vegetable or the like to which water or the like is adhered, or a part, machine, or the like to which oil or the like is adhered, instead of a tank. Alternatively, the article W may also be a container or the like in which an article that may cause dew condensation (e.g., ice, dry ice, etc.) is stored.

3. Loading/Unloading Conveyor

In this embodiment, the loading/unloading conveyor 51 is disposed at an end portion in the path direction X in the article storage facility 1 as shown in FIG. 1. Specifically, the loading/unloading conveyor 51 is disposed on the path direction second side X2 of the storage shelves 2 and is adjacent thereto. The loading/unloading conveyor 51 is configured to load the articles W from the outside of the article storage facility 1 and unload the articles W stored in the storage shelves 2 to the outside. In this embodiment, the loading/unloading conveyor 51 includes a loading conveyor 51a and an unloading conveyor 51b. The loading conveyor 51a and the unloading conveyor 51b are respectively disposed on both sides in the width direction Y of the passage 7.

In this embodiment, the loading conveyor 51a is disposed on the width direction second side Y2 of the passage 7. The loading conveyor 51a transports the articles W together with the pallets P in the path direction X. The loading conveyor 51a is configured to receive the pallet P on which the article W is placed from the outside of the storage rack 2, and deliver it to the article transport apparatus 10. The loading conveyor 51a of this example is a roller conveyor.

In this embodiment, the unloading conveyor 51b is disposed on the width direction first side Y1 of the passage 7. The unloading conveyor 51b transports the articles W together with the pallets P in the path direction X. The unloading conveyor 51b is configured to receive the pallet P on which the article W is placed from the article transport apparatus 10, and transport it to the outside of the article storage facility 1. The unloading conveyor 51b of this example is a roller conveyor as in the case of the loading conveyor 51a.

4. Article Transport Apparatus

The article transport apparatus 10 moves in the path direction X and transports the article W, as shown in FIG. 1. Specifically, the article transport apparatus 10 moves in the passage 7 disposed in the path direction X and transports the article W. In this embodiment, the article transport apparatus 10 is configured to receive the article W together with the pallet P from one of the plurality of the storage sections 3 disposed on both sides in the width direction Y of the passage 7, and transport the article W to a delivering position of the unloading conveyor 51b. Also, the article transport apparatus 10 is configured to receive the article W together with the pallet P from a receiving position located on the loading conveyor 51a, and transport the article W to one of the plurality of the storage sections 3. Note that the article transport apparatus 10 of this example is a stacker crane.

Figure 2:
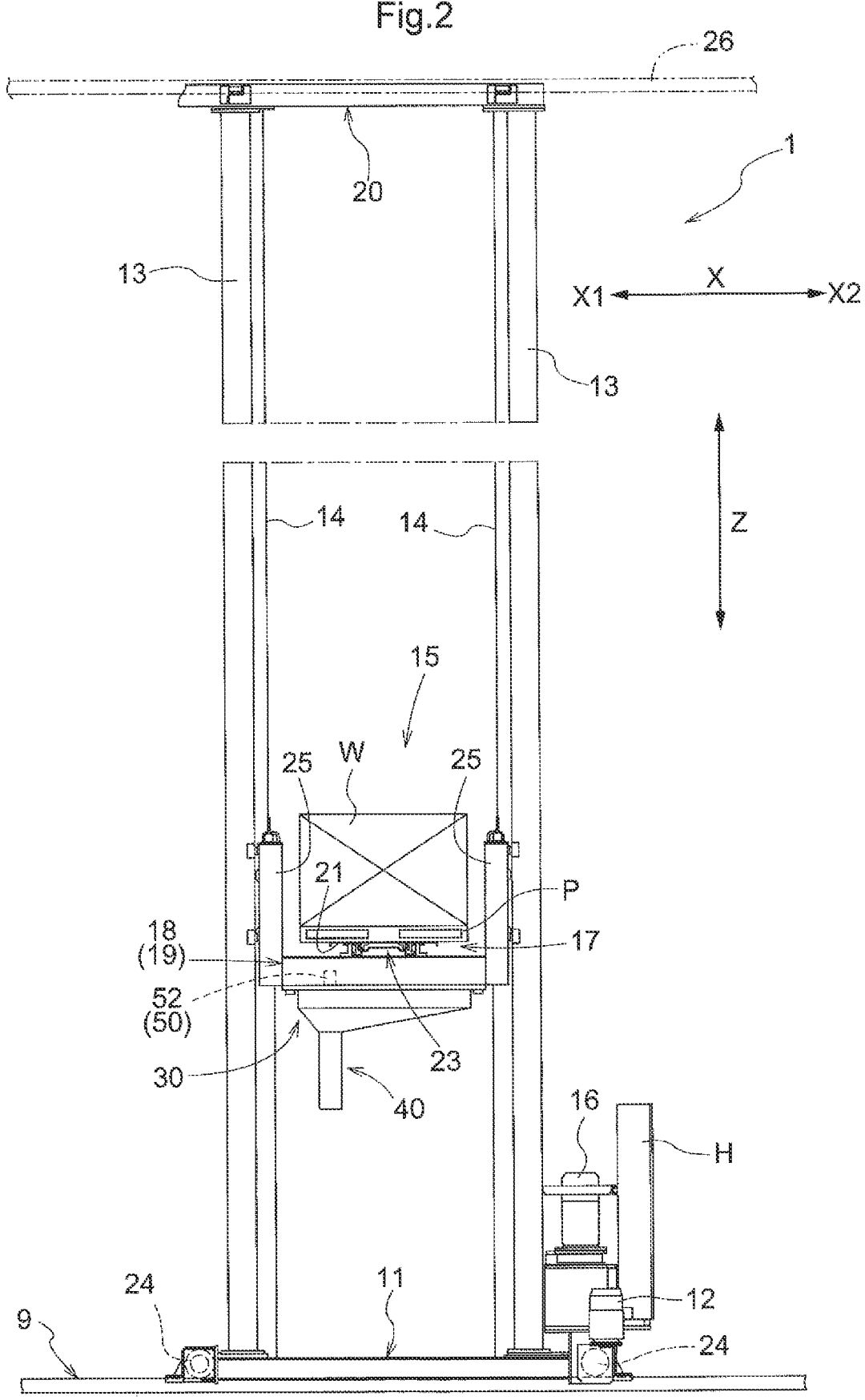
FIG. 2 is a side view of an article transport apparatus.

The article transport apparatus 10 includes, as shown in FIG. 2, a travel carriage 11 configured to travel on a travel path 8 extending along the front faces of the storage shelves 2 in which the plurality of articles W are storable, masts 13 fixed to the travel carriage 11 and extending in the vertical direction Z, a lift 15 configured to move up and down along the masts 13, and a transfer machine 17 mounted on the lift 15.

The travel carriage 11 is configured to travel along the travel path 8 formed between the pair of storage shelves 2. In other words, the travel carriage 11 is configured to travel along the travel path 8 in the passage 7 in the path direction X. In this embodiment, a rail 9 is extending along the travel path 8. The travel carriage 11 is configured to travel on the travel path 8 while being guided by the rail 9. The travel carriage 11 of this example is configured to travel on the travel path 8 while being guided by a single rail 9. The travel carriage 11 includes two travel wheels 24 that are separately provided in the path direction X. The two travel wheels 24 roll on the rail 9, and thus the travel carriage 11 travels along the rail 9. The travel carriage 11 includes a travel driving motor 12 configured to drive one travel wheel 24 of the two travel wheels 24. In the illustrated example, the travel driving motor 12 drives the travel wheel 24 of the two travel wheels 24 that is located on the path direction second side X2.

The masts 13 guide the movement in the vertical direction Z of the lift 15. The masts 13 are provided standing upright at both end portions in the path direction X of the travel carriage 11 and extend in the vertical direction Z. That is, the travel carriage 11 includes two masts 13. The upper end portions of the pair of masts 13 are coupled to each other by an upper frame 20. The upper frame 20 of this example is configured to be guided in the path direction X by an upper rail 26.

The lift 15 is configured to move up and down along the masts 13 and thereby move the article W in the vertical direction Z during transport as shown in FIG. 2. In this embodiment, the lift 15 is configured to move the article W together with the pallet P in the vertical direction Z during transport. The lift 15 of this example is suspended from and supported by raising/lowering chains 14 that are coupled to both sides in the path direction X of the upper frame 20. The raising/lowering chains 14 are wound around a plurality of sprockets and are coupled to a winding drum (not illustrated) provided on the travel carriage 11. The winding drum is rotatable forward and backward in response to driving by a raising/lowering driving motor 16 (see FIG. 7). The operations of the raising/lowering chains 14 such as feeding and winding are performed by the raising/lowering driving motor 16 driving the winding drum. The article transport apparatus 10 operates the raising/lowering chains 14 in this manner, and thus raises and lowers the lift 15 along the masts 13.

Figure 3:
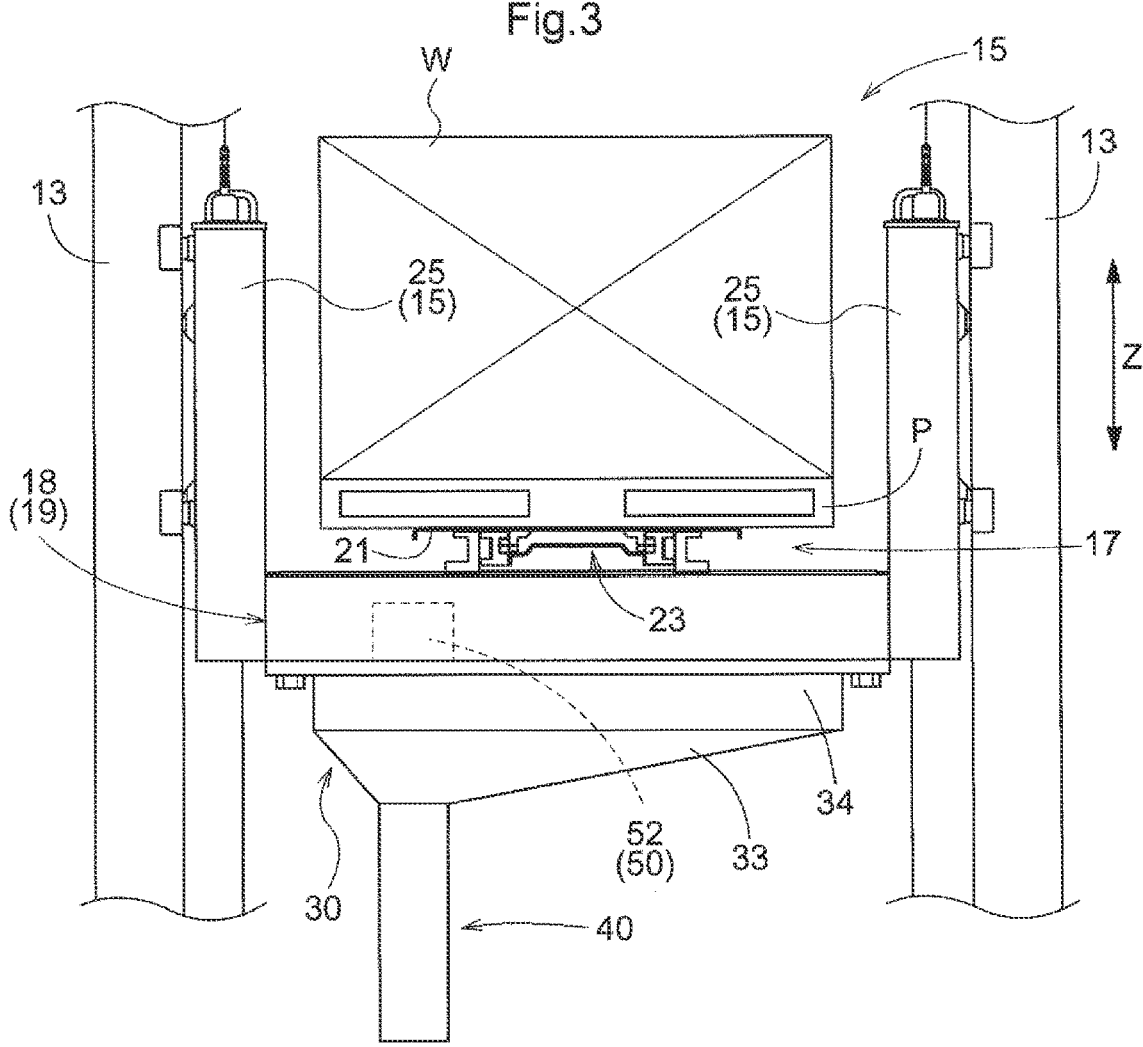
FIG. 3 is a side view illustrating a lift and a receiver.

In this embodiment, the lift 15 includes a support 19 that supports the transfer machine 17 from below as shown in FIGS. 2 and 3. Also, in this embodiment, the lift 15 further includes lift members 25.

A pair of lift members 25 are disposed spaced apart from each other in the path direction X. The raising/lowering chains 14 are respectively connected to the lift members 25. Each of the pair of lift members 25 is guided by the corresponding mast 13 and is movable in the vertical direction Z. The pair of lift members 25 are connected to each other via the support 19.

Figure 4:
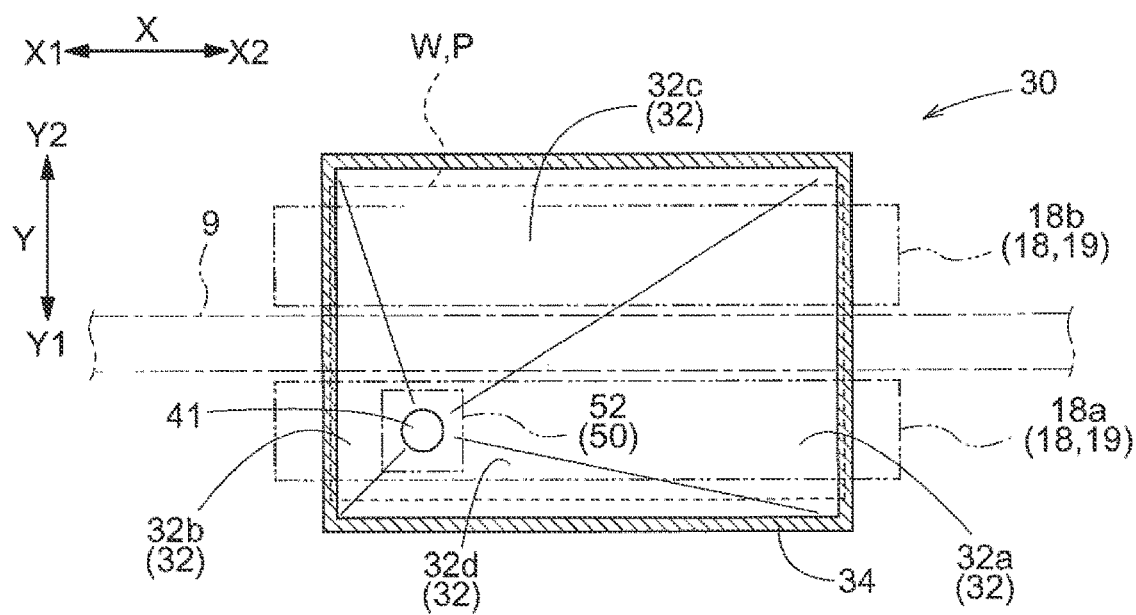
FIG. 4 is a plan view of the receiver.

The transfer machine 17 is placeable and supportable on the support 19, and the support 19 supports the article W together with the pallet P from below via the transfer machine 17. Also, the support 19 holds a receiver 30, which will be described later, from above. In this embodiment, the support 19 includes a pair of support members 18 (a first support member 18a and a second support member 18b) as shown in FIG. 4. That is, the pair of support members 18 support the transfer machine 17 from below. Each of the pair of support members 18 of this example is a member having a rectangular parallelepiped shape, and is disposed such that the longitudinal direction thereof extends along the path direction X. The pair of support members 18 are disposed spaced apart from each other in the width direction Y, and are disposed extending in the path direction X. The pair of support members 18 of this example are spaced apart from each other in the width direction Y according to the length in the width direction Y of the lift member 25. The support members 18 connect the pair of lift members 25 disposed spaced apart from each other in the path direction X. Specifically, both end portions of each of the pair of support members 18 are fixed to the lower end portions of the pair of lift members 25.

In this embodiment, the first support member 18a is disposed on the width direction first side Y1 of the rail 9 as viewed in the vertical direction Z, as shown in FIG. 4. The second support member 18b is disposed on the width direction second side Y2 of the rail 9 as viewed in the vertical direction Z. The first support member 18a of this example is disposed at a position that overlaps an opening 41 formed in the receiver 30, which will be described later, as viewed in the vertical direction Z. Also, the first support member 18a of this example is provided with a liquid detector 50, which will be described later, located in a region that overlaps the opening 41 (see FIG. 5).

The transfer machine 17 includes a holder 21 configured to hold the article W, and a movement mechanism 23 configured to move the article W, as shown in FIG. 3. The holder 21 is configured to hold the article W at least while the article transport apparatus 10 transports the article W. The movement mechanism 23 is configured to be capable of moving the article W in the width direction Y. In this embodiment, the movement mechanism 23 is a mechanism configured to move the holder 21 in the width direction Y.

The movement mechanism 23 is configured to move the article W between a holding position, at which the article W is held while the travel carriage 11 is traveling and the lift 15 is moving up or down, and a delivery position, at which the article W is present when delivered to the storage rack 2, and to transfer the article W between the holder 21 and the storage rack 2. More specifically, the movement mechanism 23 is configured to move the article W from the holding position to the delivery position, and transfer the article W between the storage section 3 and the holder 21. In this embodiment, the holder 21 protrudes and retracts in the width direction Y when transferring the article W. In the following description, the orientation of the holder 21 protruding toward the storage rack 2 is referred to as the "protruding orientation", and the orientation of the holder 21 retracted toward the lift 15 is referred to as the "retracted orientation". While the holder 21 is holding the article W, the holder 21 is in the retracted orientation when the article W is held at the holding position, and the holder 21 is in the protruding orientation when the article W is at the delivery position. The holder 21 of this example is a fork configured to support the pallet P on which the article W is placed. Note that, in this embodiment, the movement mechanism 23 is configured to be capable of transferring the article W between the holder 21 and each of the pair of storage shelves 2 disposed on both sides in the width direction Y of the passage 7.

In this embodiment, when the article W held by the holder 21 is located at the holding position, the article W does not protrude from the lift 15 in the width direction Y. Here, the article W located at the holding position is disposed at a position that does not overlap the storage section 3 but overlaps the support 19 of the lift 15 as viewed in the vertical direction Z. Moreover, when the article W held by the holder 21 is located at the delivery position, the article W protrudes from the lift 15 in the width direction Y. Here, the article W located at the delivery position is disposed at a position that does not overlap the support 19 of the lift 15 but overlaps the storage section 3 as viewed in the vertical direction Z.

Here, the operation of the transfer machine 17 will be described. When the article transport apparatus 10 transports the article W to the storage rack 2, the transfer machine 17 causes the holder 21 holding the article W to protrude toward one storage section 3 serving as a transport target in the width direction Y to change the orientation from the retracted orientation to the protruding orientation, while the lift 15 is stopped at a position corresponding to the target storage section 3. Specifically, the movement mechanism 23 moves the holder 21 from the retracted orientation position to the protruding orientation position, and thus inserts the holder 21 into a space above the pair of placement members 5 of the storage section 3. Thus, the article W is moved from the holding position to the delivery position. Thereafter, the transfer machine 17 moves the holder 21 downward. Here, the length in the path direction X of the holder 21 is shorter than the distance in the path direction X of a space between the pair of placement members 5. Therefore, it is possible to move the holder 21 between the pair of placement members 5 from above the placement members 5 to below the placement members 5 without interference with the placement members 5. Accordingly, the article W is placed on the pair of placement members 5 together with the pallet P. Thereafter, the transfer machine 17 retracts the holder 21 no longer holding an article W in the width direction Y to change the orientation from the protruding orientation to the retracted orientation. This movement of the holder 21 is also performed by the movement mechanism 23. The article W is transferred from the holder 21 to the storage section 3 by such an operation. When the article W is transferred from the storage section 3 to the holder 21, the transfer machine 17 executes this operation in reverse. Note that the movement mechanism 23 of this example is a protruding/retracting driving mechanism that is supported by the pair of support members 18 and is configured to cause the holder 21 (fork) to protrude and retract.

In this embodiment, transfer target positions of the transfer machine 17 include the receiving position of the loading conveyor 51a and the delivering position of the unloading conveyor 51b in addition to the storage section 3. That is, the transfer machine 17 also receives the article W from the receiving position of the loading conveyor 51a and delivers the article W to the delivering position of the unloading conveyor 51b. The holder 21 of this example is a fork that protrudes and retracts in the width direction Y as described above. Accordingly, in this embodiment, an up-and-down lift 53 configured to move the pallet P upward from the roller is provided at the receiving position of the loading conveyor 51a as shown in FIG. 1. The up-and-down lift 53 lifts the pallet P that has been transported on an incoming conveyor 31, at the receiving position. Then, the pallet P on which the article W is placed is transferred from the loading conveyor 51a to the holder 21 (fork) by inserting the holder 21 into a space below the lifted pallet P and raising the holder 21 in this state. Thereafter, the article transport apparatus 10 transports the pallet P on which the article W is placed to the storage section 3 of the storage rack 2. Note that, in this embodiment, the delivering position of the unloading conveyor 51b is also provided with an up-and-down lift 53.

5. Receiver

Figure 5:
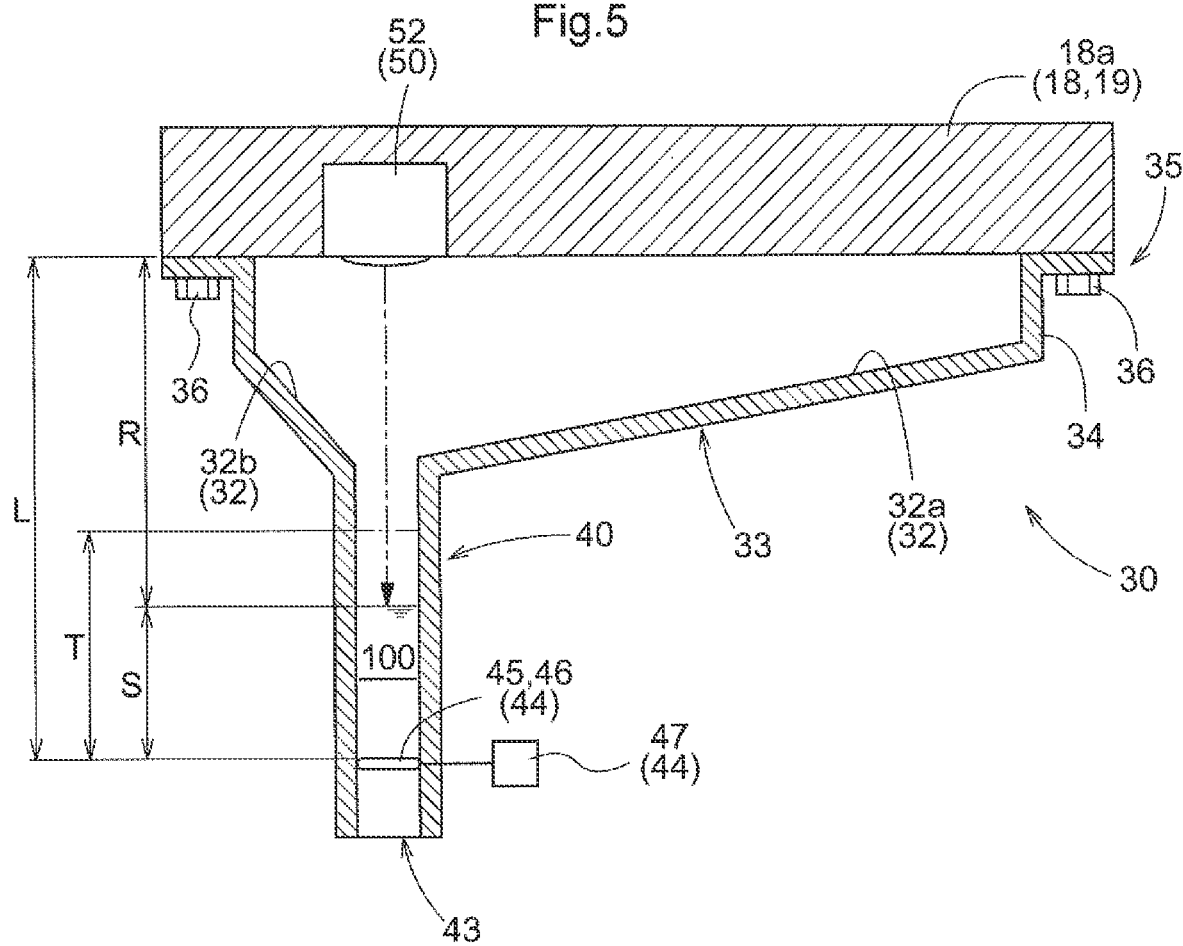
FIG. 5 is a cross-sectional view illustrating a support, the receiver, and a collector.

The article transport apparatus 10 includes a receiver 30 held by the lift 15 and configured to receive liquid 100 that has dripped from the article W, as shown in FIGS. 2 and 5. The receiver 30 is held by the lift 15, and thus moves up and down (moves in the vertical direction Z) together with the lift 15. That is, the distance in the vertical direction Z between the receiver 30 and the article W located at the holding position is constant. Since the distance in the vertical direction Z from the article W located at the holding position to the receiver 30 is constant as described above, even when the travel carriage 11 travels or the lift 15 moves up or down, the receiver 30 can receive the liquid 100 that has dripped from the article W while being less susceptible to inertial force or air pressure. Needless to say, when the travel carriage 11 and the lift 15 are stopped, the receiver 30 can also appropriately receive the liquid 100 that has dripped from the article W. In this embodiment, the receiver 30 is suspended from the lift 15 and supported from above.

The receiver 30 is disposed to cover, from below, the entire bottom surface of the article W located at the holding position, as shown in FIG. 4. Here, the receiver 30 is provided to encompass the entire bottom surface of the article W as viewed in the vertical direction Z. Thus, even if the liquid 100 drips from any position of the article W, the receiver 30 can more appropriately receive the falling liquid 100. In this embodiment, the pallet P is larger than the article W as viewed in the vertical direction Z, and therefore, the receiver 30 is provided to encompass the entire bottom surface of the pallet P located at the holding position as viewed in the vertical direction Z. In the illustrated example, the receiver 30 has a rectangular shape as viewed in the vertical direction Z. Also, the receiver 30 of this example is disposed to overlap a portion of the support 19 disposed above the receiver 30, more specifically a portion of the first support member 18a and a portion of the second support member 18b, as viewed in the vertical direction Z.

A receiving surface 32 of the receiver 30 that faces upward is entirely inclined to extend gradually downward toward a collector 40, as shown in FIGS. 3 and 5. In this embodiment, the entire receiving surface 32 is inclined to extend gradually downward toward the opening 41 of the collector 40. Accordingly, the liquid 100 that has dripped onto the receiving surface 32 flows downward on the receiving surface 32 along the inclination, and is then stored in the collector 40 through the opening 41. The receiving surface 32 of this example has a rectangular shape as viewed in the vertical direction Z. Also, the receiving surface 32 includes a first inclined surface 32a, a second inclined surface 32b, a third inclined surface 32c, and a fourth inclined surface 32d. These four inclined surfaces 32a, 32b, 32c, and 32d are divided by boundary lines that connect the four corners of the receiving surface 32 (the four apices of the receiving surface 32 having a rectangular shape as viewed in the vertical direction Z) and the center of the opening 41, and have a planar shape. The first inclined surface 32a is disposed on the path direction second side X2 of the opening 41. The second inclined surface 32b is disposed on the path direction first side X1 of the opening 41. The third inclined surface 32c is disposed on the width direction second side Y2 of the opening 41. The fourth inclined surface 32d is disposed on the width direction first side Y1 of the opening 41. In the illustrated example, the first inclined surface 32a is inclined more gently than the second inclined surface 32b. Similarly, the third inclined surface 32c is inclined more gently than the fourth inclined surface 32d (see FIGS. 4 and 5).

In this embodiment, the receiver 30 includes a main portion 33 that forms the receiving surface 32, and a side wall portion 34, as shown in FIG. 5. The side wall portion 34 extends upward from the entire peripheral edge of the main portion 33. The main portion 33 has a plate shape, and the upper surface of the main portion 33 serves as the receiving surface 32. Accordingly, the main portion 33 has a shape corresponding to the receiving surface 32. Specifically, the entire main portion 33 is formed in a shape that is inclined to extend gradually downward toward the collector 40. Also, the main portion 33 has a rectangular shape as viewed in the vertical direction Z. The main portion 33 and the side wall portion 34 of this example are formed in one piece.

The receiver 30 is disposed below the support 19 and is held by the support 19, as shown in FIGS. 3 and 5. In this embodiment, the receiver 30 is suspended from and held by the support 19 by fixing a fixation portion 35 provided in the receiver 30 to the support 19 as shown in FIG. 5. In the illustrated example, the fixation portion 35 is provided at the upper end portion of the side wall portion 34, and is fixed to the support member 18 using fastening bolts 36.

6. Collector

The article transport apparatus 10 further includes the collector 40 configured to collect the liquid 100 received by the receiver 30. This collector 40 is connected to the receiver 30. Here, the collector 40 is disposed at a position corresponding to the lowermost portion of the receiver 30 as shown in FIGS. 3 and 5, and is configured to collect the liquid 100 received by the receiver 30. Also, the collector 40 connected to the receiver 30 is continuous with the receiver 30, and the collected liquid 100 is pooled in the collector 40.

In this embodiment, the collector 40 connected to the receiver 30 protrudes downward from the receiver 30. That is, the collector 40 is integrally provided with the receiver 30. Also, in this embodiment, the collector 40 is in a shape of a bottomed tube with an opening 41 at a lowermost portion of the receiving surface 32. In the illustrated example, the collector 40 has a bottomed cylindrical shape. Accordingly, the opening 41 has a circular shape and is open upward, as shown in FIG. 4. Also, in this embodiment, the collector 40 is disposed at a position that does not overlap the rail 9 as viewed in the vertical direction Z. Specifically, the collector 40 is disposed on the width direction first side Y1 of the rail 9. Also, the collector 40 is provided on the path direction first side X1 of the central portion in the path direction X of the receiving surface 32. Furthermore, the collector 40 of this example is provided at a position that overlaps the first support member 18a as viewed in the vertical direction Z.

In this embodiment, the collector 40 further includes a pooling portion 42 and a bottom portion 45. The pooling portion 42 extends downward from the peripheral edge of the opening 41 that is open in the receiving surface 32, and is continuous with the receiver 30. The pooling portion 42 of this example has a cylindrical shape. That is, the pooling portion 42 corresponds to the cylindrical portion of the collector 40 having a bottomed cylindrical shape. The bottom portion 45 is provided to close the lower end portion of the pooling portion 42. The bottom portion 45 of this example has a disk shape. Since the collector 40 includes this bottom portion 45, the liquid 100 collected in the collector 40 is pooled in the pooling portion 42 without flowing out downward. In this embodiment, the bottom portion 45 also functions as a valve body 46 of an on-off valve 44, which will be described later.

In this embodiment, the collector 40 is configured to be capable of discharging the pooled liquid 100. The collector 40 includes a discharge hole 43 through which the liquid 100 collected inside the collector 40 is discharged, the on-off valve 44 configured to open and close the discharge hole 43, and a valve driving unit 47 configured to drive the on-off valve 44 to open and close the on-off valve, as shown in FIG. 5. The liquid 100 collected inside is discharged to the outside through the discharge hole 43 when the on-off valve 44 is opened. Also, when the on-off valve 44 is closed, the bottom portion 45 serving as the valve body 46 of the on-off valve 44 blocks the liquid 100 such that the liquid 100 is not discharged through the discharge hole 43, and thus the liquid 100 remains in the pooling portion 42. Note that, in this embodiment, the discharge hole 43 is integrally formed in the pooling portion 42, and is continuous with and extends downward from the lower end of the pooling portion 42.

In this embodiment, the on-off valve 44 is provided at the boundary between the pooling portion 42 and the discharge hole 43. In other words, the pooling portion 42 and the discharge hole 43 in the collector 40 are separated by the on-off valve 44. The on-off valve 44 of this example includes the valve body 46 and the valve driving unit 47. The above-described bottom portion 45 functions as the valve body 46. The valve driving unit 47 drives the valve body 46 to open and close the on-off valve 44. The valve driving unit 47 of this example includes a valve driving motor 48 (see FIG. 7), and is configured to transfer the driving force generated by the valve driving motor 48 to the valve body 46 to open and close the on-off valve 44. The valve driving unit 47 is controlled by a control unit H, which will be described later. When the on-off valve 44 is closed, the bottom portion 45 serving as the valve body 46 of the on-off valve 44 blocks the liquid 100 collected in the collector 40, and thus the liquid 100 is pooled in the pooling portion 42. On the other hand, when the on-off valve 44 is open, the liquid 100 pooled in the pooling portion 42 is discharged to the outside (the lower side herein) through the discharge hole 43. The on-off valve 44 of this example is configured as a butterfly valve.

7. Liquid Detector

The article transport apparatus 10 further includes a liquid detector 50 configured to detect the amount of the liquid 100 collected in the collector 40 as shown in FIGS. 2, 3, and 7. The liquid detector 50 is provided in order to monitor the amount of the liquid 100 that has dripped from the article W transported by the article transport apparatus 10 and has been collected in the collector 40. In this embodiment, the liquid detector 50 includes an optical sensor 52 configured to detect the position of the surface of the liquid 100 collected in the collector 40. The optical sensor 52 is attached to the lift 15. More specifically, the optical sensor 52 is fixed to the support 19. The optical sensor 52 of this example is fixed to the lower surface of the first support member 18a and faces downward (see FIG. 5). Also, the optical sensor 52 is provided to overlap the opening 41 of the collector 40 as viewed in the vertical direction Z.

In this embodiment, the optical sensor 52 is disposed right above the opening 41 of the collector 40 as shown in FIG. 5, and is configured to measure a detection distance R corresponding to the distance from the surface of the liquid 100 pooled in the pooling portion 42 to the optical sensor 52. For example, a laser level sensor can be used as such an optical sensor 52. Here, when the distance from the bottom portion 45 of the collector 40 to the surface of the liquid is defined as a "liquid surface height S", and the distance from the bottom portion 45 to the optical sensor 52 is defined as the "maximum distance L", the maximum distance L is stored in advance in a memory unit 60 included in the control unit H. Accordingly, the liquid detector 50 can determine the amount of the liquid 100 pooled in the pooling portion 42 by calculating the liquid surface height S using the difference between the maximum distance L and the detection distance R. Note that the liquid detector 50 may include a guide-pulse level sensor, a tuning-fork level switch, or the like.

8. Recovery Unit

Figure 6:
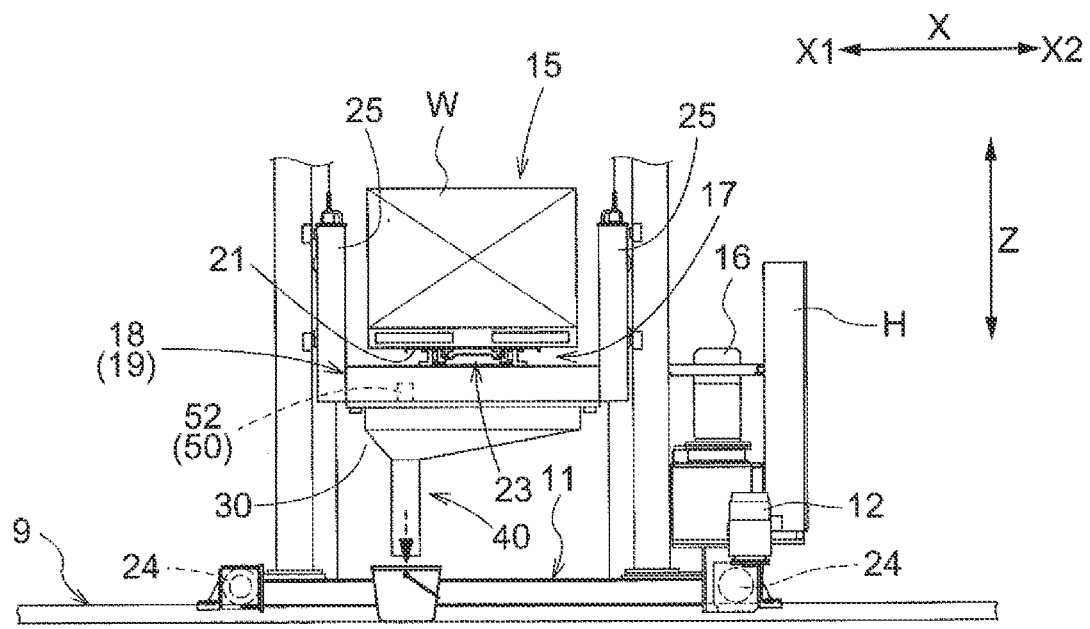
FIG. 6 is a partially enlarged view illustrating the lift and the receiver located at a recovery unit.

The article transport apparatus 10 includes a recovery unit 70 configured to recover the liquid 100 discharged through the discharge hole 43, as shown in FIGS. 1 and 6. This recovery unit 70 is adjacent to the travel path 8 while the position thereof relative to the storage shelves 2 is fixed. In this embodiment, the recovery unit 70 is disposed on the width direction first side Y1 of the rail 9. Also, the recovery unit 70 is provided on the path direction first side X1 of the storage shelves 2. The recovery unit 70 is disposed at a position that overlaps the movement locus of the discharge hole 43 that accompanies movement of the article transport apparatus 10 as viewed in the vertical direction Z. Accordingly, when the travel carriage 11 stops at a position corresponding to the recovery unit 70, the discharge hole 43 and the recovery unit 70 overlap each other as viewed in the vertical direction Z. The liquid 100 pooled in the pooling portion 42 is discharged to the recovery unit 70 through the discharge hole 43 by opening the on-off valve 44 in the above-mentioned state. Note that a movable container is used as the recovery unit 70 of this example, but, for example, a groove or the like to which the liquid 100 is to be discharged may be provided on the surface of the floor and be used as the recovery unit 70.

9. Control

The article transport apparatus 10 includes a control unit H configured to control the travel carriage 11, the lift 15, and the valve driving unit 47 as shown in FIG. 7 in order to realize the configuration as described above. The article transport apparatus 10 is provided with the control unit H (see FIG. 1). In this embodiment, the control unit H executes a transport control to carry out normal transport in which the article W is transported. The control unit H controls the travel driving motor 12 to cause the travel carriage 11 to travel to a position corresponding to a storage location for the article W in the storage rack 2. Also, the control unit H controls the travel driving motor 12 to cause the travel carriage 11 to travel to a position (receiving position, delivering position) at which the article W is to be transferred between the loading/unloading conveyor 51 and the article transport apparatus 10. The control unit H controls the raising/lowering driving motor 16 to raise or lower the lift 15 to a position corresponding to a storage location for the article W in the storage section 3 (specifically, a position at which the transfer machine 17 opposes the storage location for the article W in the width direction Y). Also, the control unit H controls the raising/lowering driving motor 16 to raise or lower the lift 15 to a position at which the article W is transferred between the loading/unloading conveyor 51 and the article transport apparatus 10. Furthermore, in this embodiment, the control unit H controls a protruding/retracting motor 22 to transfer the article W between the article transport apparatus 10 and the storage section 3 using the transfer machine 17. Also, the control unit H controls the protruding/retracting motor 22 to transfer the article W between the article transport apparatus 10 and the loading/unloading conveyor 51 using the transfer machine 17.

Furthermore, in this embodiment, when the liquid detector 50 detects that the amount of the liquid 100 is larger than or equal to a predetermined amount as shown in FIG. 5, the control unit H controls the travel carriage 11 and the lift 15 to move the lift 15 such that the discharge hole 43 is disposed at a position corresponding to the recovery unit 70. Then, the control unit H executes a discharge control in which the valve driving unit 47 is controlled to open the on-off valve 44 while the discharge hole 43 is disposed at the position corresponding to the recovery unit 70.

Here, the distance from the bottom portion 45 to the surface of the liquid when a predetermined amount of the liquid 100 is pooled in the pooling portion 42 is defined as the "set height T". The set height T is stored in the memory unit 60 in advance. When the liquid detector 50 detects that the amount of the pooled liquid 100 is smaller than that corresponding to the set height T (set height T>liquid surface height S), the control unit H controls the travel carriage 11, the lift 15, and the transfer machine 17 to continue the normal transport of the article W. When the liquid detector 50 detects that the amount of the pooled liquid 100 is larger than or equal to that corresponding to the set height T (set height T≤liquid surface height S), the control unit H executes the discharge control. In this embodiment, when the liquid detector 50 detects that the amount of the pooled liquid 100 is larger than or equal to that corresponding to the set height T, the control unit H controls a notifier 90 to operate at least one of a lamp 91 and a buzzer 92 provided in the article storage facility 1. Also, the control unit H controls the travel driving motor 12 to cause the travel carriage 11 to travel to a position at which the discharge hole 43 corresponds to the recovery unit 70 (here, a position at which the discharge hole 43 overlaps the recovery unit 70 as viewed in the vertical direction Z). Furthermore, the control unit H controls the raising/lowering driving motor 16 to raise or lower the lift 15 to a position at which the discharge hole 43 corresponds to the recovery unit 70 (here, a position at which the distance in the vertical direction Z between the discharge hole 43 and the recovery unit 70 corresponds to a predetermined distance). When the discharge hole 43 is disposed at the position corresponding to the recovery unit 70, the control unit H controls the valve driving motor 48 of the valve driving unit 47 to open the on-off valve 44.

Once the liquid 100 pooled in the pooling portion 42 has been discharged to the recovery unit 70 through the discharge hole 43, the control unit H controls the valve driving motor 48 of the valve driving unit 47 to close the on-off valve 44. Thereafter, the control unit H returns to the normal transport of the article W.

10. Other Embodiments

Next, other embodiments of the article storage facility will be described.

(1) In the exemplary configuration described in the embodiment above, the transfer machine 17 is configured to transfer the article W by protruding and retracting the holder 21 on which the article W is placed, in the width direction Y. However, there is no limitation to such a configuration. For example, a configuration may also be employed in which the transfer machine 17 includes a gripping unit configured to grip the article W and protrude and retract in the width direction Y, and the article W is transferred between the holder 21 and a transfer target portion such as the storage section 3 by protruding or retracting the gripping unit.

(2) In the exemplary configuration described in the embodiment above, the article transport apparatus 10 is configured to transport the article W together with the pallet P, and the storage section 3 is configured to store the article W placed on the pallet P. However, there is no limitation to such a configuration. The article transport apparatus 10 may also be configured to transport only the article W, and the storage section 3 may also be configured to store only the article W. Alternatively, a configuration may also be employed in which the article W stored in a container is transported and is then stored in the storage section 3.

(3) In the exemplary configuration described in the embodiment above, the fixation portion 35 provided at the upper end portion of the side wall portion 34 is fixed to the support member 18, and thus the support 19 supports the receiver 30. However, there is no limitation to such a configuration. The support 19 does not necessarily need to support the receiver 30. For example, a configuration may also be employed in which the lift member 25 supports the receiver 30.

(4) In the exemplary configuration described in the embodiment above, the opening 41 of the collector 40 is formed at the lowermost portion of the receiving surface 32, and the collector 40 and the receiver 30 are integrally provided. However, there is no limitation to such a configuration. The configuration of the collector 40 can be changed as appropriate. For example, a configuration is also favorable in which a container with an open top is used as the collector 40, and the collector 40 is connected to an opening formed in the receiving surface 32.

(5) In the exemplary configuration described in the embodiment above, the collector 40 includes the discharge hole 43 that is provided at the lower end of the pooling portion 42. However, there is no limitation to such a configuration. The collector 40 does not necessarily need to include the discharge hole 43. In such a configuration, the on-off valve 44 and the valve driving unit 47 are not needed, either. In this case, for example, a configuration is favorable in which at least one of the lamp 91 and the buzzer 92 provided in the article storage facility 1 works when the liquid detector 50 detects the liquid 100 inside the collector 40. Such a configuration is suitable for transport of the article W in a situation in which the liquid 100 does not drip from the article W in principle, but it is anticipated that the liquid 100 stored in the article W exceptionally leaks therefrom due to damage to the article W or the like.

(6) In the exemplary configuration described in the embodiment above, the control unit H executes the discharge control when the liquid detector 50 detects that the amount of the pooled liquid 100 is larger than or equal to that corresponding to the set height T. However, there is no limitation to such a configuration. For example, a configuration may also be employed in which the liquid detector 50 is configured to detect the weight of the liquid 100 collected in the collector 40, and the control unit H executes the discharge control when the liquid detector 50 detects that the pooled liquid 100 is heavier than or equal to a set weight.

(7) Note that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

11. Summary of Embodiments

The following is a summary of the article transport apparatus described above.

An article transport apparatus includes: a travel carriage configured to travel on a travel path extending along a front face of a storage rack in which a plurality of articles are storable; a mast fixed to the travel carriage and extending in a vertical direction; a lift configured to move up and down along the mast; a transfer machine mounted on the lift, the transfer machine including: a holder configured to hold an article; and a movement mechanism configured to move the article, the movement mechanism being configured to (i) move the article between a holding position, at which the article is held while the travel carriage is traveling and the lift is moving up or down, and a delivery position, at which the article is present when delivered to the storage rack, and to (ii) transfer the article between the holder and the storage rack; a receiver supported by the lift and configured to receive liquid that has dripped from the article; a collector configured to collect the liquid received by the receiver; and a liquid detector configured to detect an amount of the liquid collected by the collector, wherein the receiver covers, from below, an entire bottom surface of the article at the holding position, the collector is connected to the receiver, and the receiver has a receiving surface that faces upward and that is entirely inclined to extend gradually downward toward the collector.

With this configuration, the lift supports the receiver, and the receiver can be raised and lowered together with the lift, thus making it possible to keep the distance in the vertical direction between the receiver and the article constant. Also, the receiver is disposed to cover the entire bottom surface of an article located at the holding position from below, and therefore, even if liquid drips from any position of the article during transport, the receiver can more appropriately receive the liquid. Accordingly, it is possible to prevent the liquid that has dripped from the article during transport from splattering and falling on the travel carriage, the surface of the floor, and the like.

Also, the collector is connected to the receiver, and the entire receiving surface is inclined to extend gradually downward toward the collector. Accordingly, liquid received by the receiver can be appropriately collected in the collector. With this configuration, the liquid detector detects the liquid collected in the collector in this manner, and therefore, the amount of the liquid that has dripped from the article can be more easily and accurately detected compared with the case of detecting the amount of liquid in the receiver.

As described above, with this configuration, it is possible to realize an article transport apparatus in which liquid that has dripped from an article can be appropriately received, and the amount of the received liquid can be easily and accurately detected.

Here, it is preferable to adopt a configuration in which the lift includes a support supporting the transfer machine from below, and the receiver is below the support and is held by the support.

With this configuration, it is possible to dispose the receiver at a position at which the receiver covers the entire bottom surface of the article located at the holding position from below, without interference with the support. Accordingly, the receiver can appropriately receive liquid that has dripped from the article during transport.

Also, it is preferable to adopt a configuration in which the collector is in a shape of a bottomed tube with an opening at a lowermost portion of the receiving surface.

With this configuration, the collector is in a shape of a bottomed tube. Therefore, it is easy to obtain the same cross-sectional area at any position in the vertical direction of the collector, thus making it easy to make the correspondence relationship between the height of liquid in the collector and the amount of liquid collected in the collector constant. Accordingly, the liquid detector can easily detect the amount of liquid. Also, the collector is open at the lowermost portion of the receiving surface, thus making it possible to more appropriately collect the liquid received by the receiver.

Also, it is preferable to adopt a configuration in which the collector includes: a discharge hole through which the liquid collected inside the collector is discharged; an on-off valve configured to open and close the discharge hole; and a valve driving unit configured to drive the on-off valve to open and close the on-off valve.

With this configuration, it is possible to discharge the liquid collected in the collector from the collector at a desired timing by opening the on-off valve.

Also, it is preferable to adopt a configuration in which the article transport apparatus further includes: a control unit configured to control the travel carriage, the lift, and the valve driving unit; and a recovery unit configured to recover the liquid discharged through the discharge hole, wherein the recovery unit is adjacent to the travel path and fixed in position relative to the storage rack, and in response to the liquid detector detecting the liquid in an amount larger than or equal to a predetermined amount, the control unit controls the travel carriage and the lift to move the lift such that the discharge hole is at a position corresponding to the recovery unit, and controls the valve driving unit to open the on-off valve for the discharge of the liquid with the discharge hole at the position corresponding to the recovery unit.

With this configuration, it is possible to discharge, at an appropriate timing, the liquid pooled in the collector and to recover the liquid discharged to the recovery unit. Also, it is possible to automatically execute such liquid discharge based on the detection results obtained by the liquid detector.

INDUSTRIAL APPLICABILITY

The technology according to the present disclosure can be used in an article transport facility.

What is claimed is:

1. An article transport apparatus comprising:
a travel carriage configured to travel on a travel path extending along a front face of a storage rack in which a plurality of articles are storable;
a mast fixed to the travel carriage and extending in a vertical direction;
a lift configured to move up and down along the mast;
a transfer machine mounted on the lift,
the transfer machine comprising:
a holder configured to hold an article; and
a movement mechanism configured to move the article,
wherein the movement mechanism is configured to (i) move the article between a holding position, at which the article is held while the travel carriage is traveling and the lift is moving up or down, and a delivery position, at which the article is present when delivered to the storage rack, and to (ii) transfer the article between the holder and the storage rack;
a receiver supported by the lift and configured to receive liquid that has dripped from the article;
a collector configured to collect the liquid received by the receiver; and
a liquid detector configured to detect an amount of the liquid collected by the collector,
wherein the receiver covers, from below, an entire bottom surface of the article at the holding position,
wherein the collector is connected to the receiver, and the collector is in a shape of a bottomed tube with an opening at a lowermost portion of the receiving surface, and
wherein the receiver has a receiving surface that faces upward and that is entirely inclined to extend gradually downward toward the collector.

2. The article transport apparatus according to claim 1, wherein the lift comprises a support supporting the transfer machine from below, and
wherein the receiver is below the support and is held by the support.

3. The article transport apparatus according to claim 1, wherein the collector comprises:
a discharge hole through which the liquid collected inside the collector is discharged;
an on-off valve configured to open and close the discharge hole; and
a valve driving unit configured to drive the on-off valve to open and close the on-off valve.

4. An article transport apparatus comprising:
a travel carriage configured to travel on a travel path extending along a front face of a storage rack in which a plurality of articles are storable;
a mast fixed to the travel carriage and extending in a vertical direction;
a lift configured to move up and down along the mast;
a transfer machine mounted on the lift,
the transfer machine comprising:
a holder configured to hold an article; and
a movement mechanism configured to move the article,
wherein the movement mechanism is configured to (i) move the article between a holding position, at which the article is held while the travel carriage is traveling and the lift is moving up or down, and a delivery position, at which the article is present when delivered to the storage rack, and to (ii) transfer the article between the holder and the storage rack;
a receiver supported by the lift and configured to receive liquid that has dripped from the article;
a collector configured to collect the liquid received by the receiver;
wherein the collector comprises:
a discharge hole through which the liquid collected inside the collector is discharged;
an on-off valve configured to open and close the discharge hole; and
a valve driving unit configured to drive the on-off valve to open and close the on-off valve,
a liquid detector configured to detect an amount of the liquid collected by the collector,
wherein the receiver covers, from below, an entire bottom surface of the article at the holding position,
wherein the collector is connected to the receiver,
wherein the receiver has a receiving surface that faces upward and that is entirely inclined to extend gradually downward toward the collector,
a control unit configured to control the travel carriage, the lift, and the valve driving unit; and
a recovery unit configured to recover the liquid discharged through the discharge hole,
wherein the recovery unit is adjacent to the travel path and fixed in position relative to the storage rack, and
wherein, in response to the liquid detector detecting the liquid in an amount larger than or equal to a predetermined amount, the control unit controls the travel carriage and the lift to move the lift such that the discharge hole is at a position corresponding to the recovery unit, and controls the valve driving unit to open the on-off valve for the discharge of the liquid with the discharge hole at the position corresponding to the recovery unit.

* * * * *